J. & C. H. EWE.
SHARPENER ATTACHMENT FOR MOWERS.
APPLICATION FILED JAN. 24, 1910.
1,027,114.
Patented May 21, 1912.
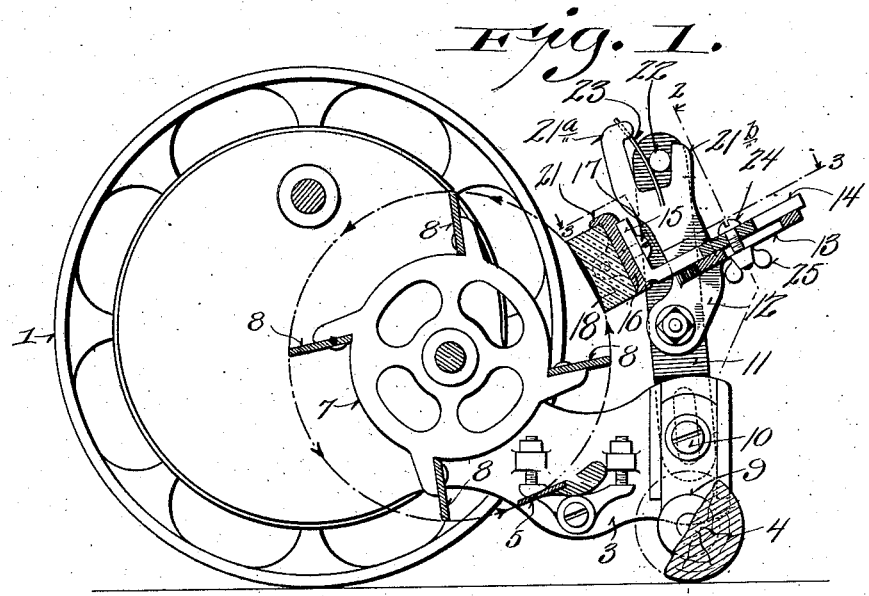
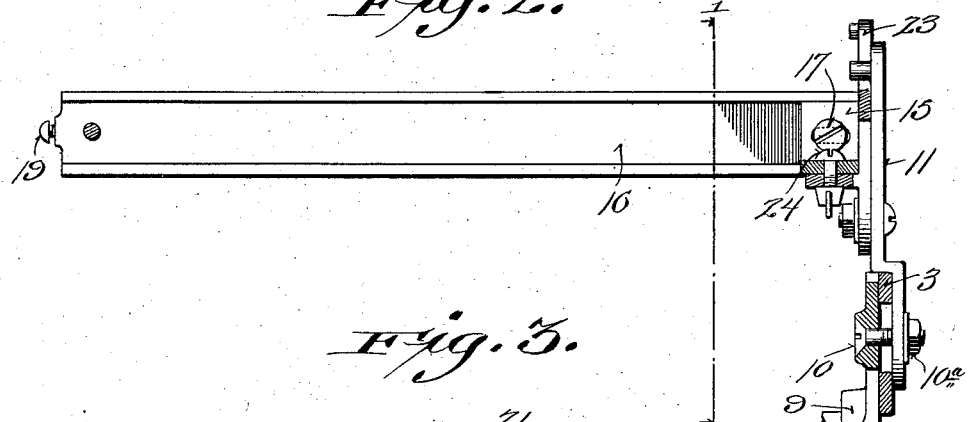
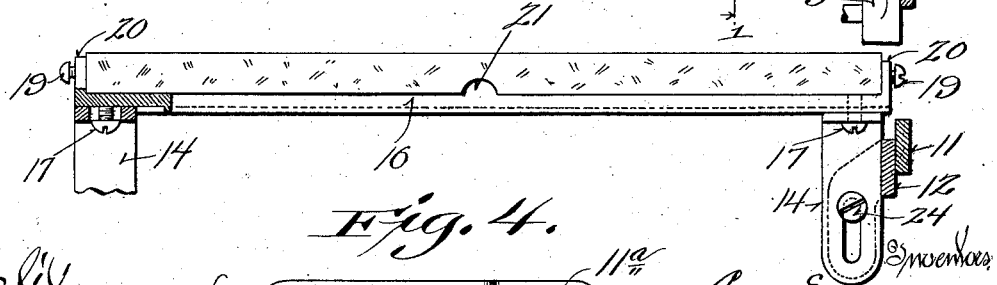
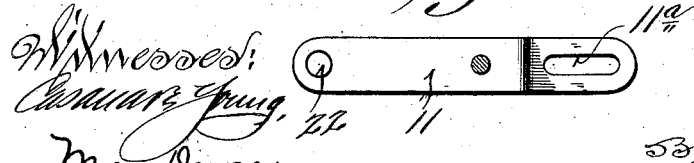

UNITED STATES PATENT OFFICE.

JENNIE EWE AND CHARLES H. EWE, OF RACINE, WISCONSIN.

SHARPENER ATTACHMENT FOR MOWERS.

1,027,114.  Specification of Letters Patent.  Patented May 21, 1912.

Application filed January 24, 1910. Serial No. 539,766.

*To all whom it may concern:*

Be it known that we, JENNIE EWE and CHARLES H. EWE, citizens of the United States, and residents of Racine, in the county of Racine and State of Wisconsin, have invented certain new and useful Improvements in Sharpener Attachments for Mowers; and we do hereby declare that the following is a full, clear, and exact description thereof.

The object of our invention is to provide an automatic blade-sharpener attachment for lawn-mowers, the arrangement and construction being such that the device can be readily secured to any standard type of mower and adjusted in position relative to the knives thereof, whereby the latter will be ground during a mowing operation.

The invention therefore consists in various details of construction and combination of parts as fully set forth hereinafter with reference to the drawings and subsequently claimed.

In the drawings Figure 1 represents a cross-sectional view of a portion of a standard lawn-mower having attached thereto a blade-sharpener embodying the features of our invention, the sharpener being in section as indicated by line 1—1 of Fig. 2; Fig. 2, a detail sectional elevation of the sharpener with parts broken away and parts in section as indicated by line 2—2 of Fig. 1; Fig. 3, a detail sectional plan view of the same as indicated by line 3—3 of Fig. 1, and Fig. 4, a detail view of the sharpener supporting arm.

Referring by characters to the drawings 1 indicates a mower driving wheel and 2 the usual gear casing provided with a rearward extension 3 for the support of a gage-roller 4 and the adjustable shear-plate 5. Mounted upon a shaft 6 is the usual reel 7 carrying a series of blades 8, which blades are adapted to have shearing engagement with the shear-plate. The gage-roller 4 is adjustably connected to the rearward extension 3 by means of journal-boxes 9, which journal-boxes are secured to said extensions 3 by bolts 10 and nuts 10ª in threaded engagement therewith. These bolts 10 are utilized for attaching our sharpening device, their location being convenient for the purpose. To attach this sharpener, the nuts 10ª are removed and arms 11, provided with slotted feet 11ª, are inserted over the bolts, each arm being thereafter secured between the nut and adjacent face of the rearward extensions 3, it being understood that only one of the extensions are shown in the drawings.

Hangers 12 are pivoted to the respective arms 11, which hangers have slotted foot-pieces 13 that serve as supports for corresponding feet of brackets 14. These brackets have ears 15 that extend at right angles thereto for the support of a metallic strip 16, the strip being extended longitudinally of the mower and rearward of its knives. The ear 15 and strip 16 are secured together by retaining screws 17, which screws pass through slots in the ears and are in screw-threaded connection with said strip.

By utilizing the slotted ear connection between the strip and ears of the bracket the sharpening device is rendered capable of slight longitudinal adjustment as to width, whereby the same may be fitted to mowers varying in width of cut.

The strip 16 serves as a backing or support for a rectangular bar 18, of abrading material, the bar being shown in this instance secured to the strip by means of set-screws 19, which screws are in threaded engagement with lugs 20 that extend from ends of the strip 16 and overlap the ends of said abrading bar, there being a lip 21 extending from the strip 16, approximately midway of its length, which lip serves as an intermediate support for the abrading bar. The screw connection for securing the abrading bar and strip together, thus permits renewal of said bar from time to time as the case may require, it being understood, however, that in some instances, said bar may be cemented or otherwise secured to the trip 16.

The upper end of each hanger 12, is provided with fingers 21, 21ª, between which a teat 22 projects, the teat being extended from the upper ends of the arms 11. Each hanger 12 is provided with a leaf-spring 23, having one end embedded in said hanger 12, between the fingers, the spring extending upwardly, its free end being arranged to seat against the adjacent terminal of the finger 21ª. These leaf-springs exert pressure upon the teat 22 and thus draw the fingers 21 in contact therewith whereby the upper ends of hangers 12, are each held in yielding relation with the arms, the same being adapted to swing upon their pivots.

To adjust the working face of the abrading bar in position to operate upon the knives, the brackets 14, are either moved backward or forward and when the correct position is ascertained said brackets are locked in their adjusted position by means of bolts 24, which bolts pass through the brackets and slotted apertures in the feet 13, of the hangers 12, the bolts being secured by suitable thumb-nuts 25, in screw-threaded engagement therewith.

The yielding connection between the arm 11 and the hangers 12, is for the purpose of compensating for any variations between the working face of the abrading-bar and cutting edges of the knives. Thus it will be understood that the leaf-springs 23 insure a constant pressure between said knives and bar with each revolution of the reel, the blades being sharpened as the same are rotated in the direction of the arrows, as indicated in Fig. 1, which direction is that assumed in mowing. By utilizing a slotted foot in the arms 11 it will also be seen that the entire device may be raised and lowered or swung inwardly or outwardly, whereby the finest adjustment may be obtained between the knives and abrading bar, and it should be further understood that the device can readily be thrown backward to a position where it is inoperative as a grinder, but in no way interferes with the operation of the mower.

While we have shown and described a convenient combination of members for attaching the abrading bar to a mower, it is understood that these members may be varied in accordance with a knowledge of skilled mechanics for accomplishing the same results, without departing from the spirit of our invention, the essential feature of which our invention consists in securing an abrading bar to a lawn-mower of any standard type, the abrading bar being disposed rearwardly of the knives and positioned to have grinding contact with their cutting edges, when said mower is moved in a forwardly direction. Furthermore, by utilizing the gage-roller retaining bolt for securing our device in position we are thus enabled to dispense with any changes in the lawn-mower and said device may be readily attached by those unskilled in mechanics.

We claim:

1. In a lawn-mower having a frame, a rotatory reel mounted in the frame, blades carried by the reel, the gage-roller, journal-boxes for the gage-roller and bolts for securing the journal-boxes to the frame; the combination of a sharpener attachment comprising: arms adjustably supported by the journal-box bolts, a backing-strip secured to the arms and a bar of abrading material secured to the backing-strip, the bar being adjusted to engage the reel blades with each rotation thereof.

2. In a lawn-mower having a frame, a rotatory reel mounted in the frame, blades carried by the reel, the gage-roller, journal-boxes for the gage-roller, and bolts for securing the journal-boxes to the frame; the combination of a sharpener attachment comprising arms supported by the journal-box bolts, hangers carried by the arms, brackets adjustably secured to the hangers a backing-strip secured to the arms and a bar of abrading material secured to the backing-strip, the bar being adjusted to engage the reel blades with each rotation thereof.

3. In a lawn-mower having a frame, a rotatory reel mounted in the frame, blades carried by the reel, the gage-roller, journal boxes for the gage-roller, and bolts for securing the journal-boxes to the frame; the combination of a sharpener attachment comprising arms supported by the journal-box bolts, hangers pivoted to the arms, a teat extending from the upper end of each arm, a pair of fingers extending from the hangers upon opposite sides of the teats, a spring connection between the hanger, one of the hanger arms and teat, a bracket adjustably secured to each hanger, a backing-strip secured to the arms, and a bar of abrading material secured to the backing-strip, the bar being adjusted to engage the reel blades with each rotation thereof.

4. In a lawn-mower having a frame, a rotatory reel mounted in the frame, blades carried by the reel, the gage-roller, journal-boxes for the gage-roller, and bolts for securing the journal-boxes to the frame; the combination of a sharpener attachment comprising arms supported by the journal-box bolts, hangers pivotally mounted upon the arms, a yielding connection between the arms and hangers, feet extending from said hangers, brackets adjustably secured to the feet, and a bar of abrading material secured to the hangers.

In testimony that we claim the foregoing we have hereunto set our hands at Milwaukee in the county of Milwaukee and State of Wisconsin in the presence of two witnesses.

JENNIE EWE.
CHARLES H. EWE.

Witnesses:
GEO. W. YOUNG,
MAY DOWNEY.

---

Copies of this patent may be obtained for five cents each, by addressing the "Commissioner of Patents, Washington, D. C."